United States Patent Office 2,698,831
Patented Jan. 4, 1955

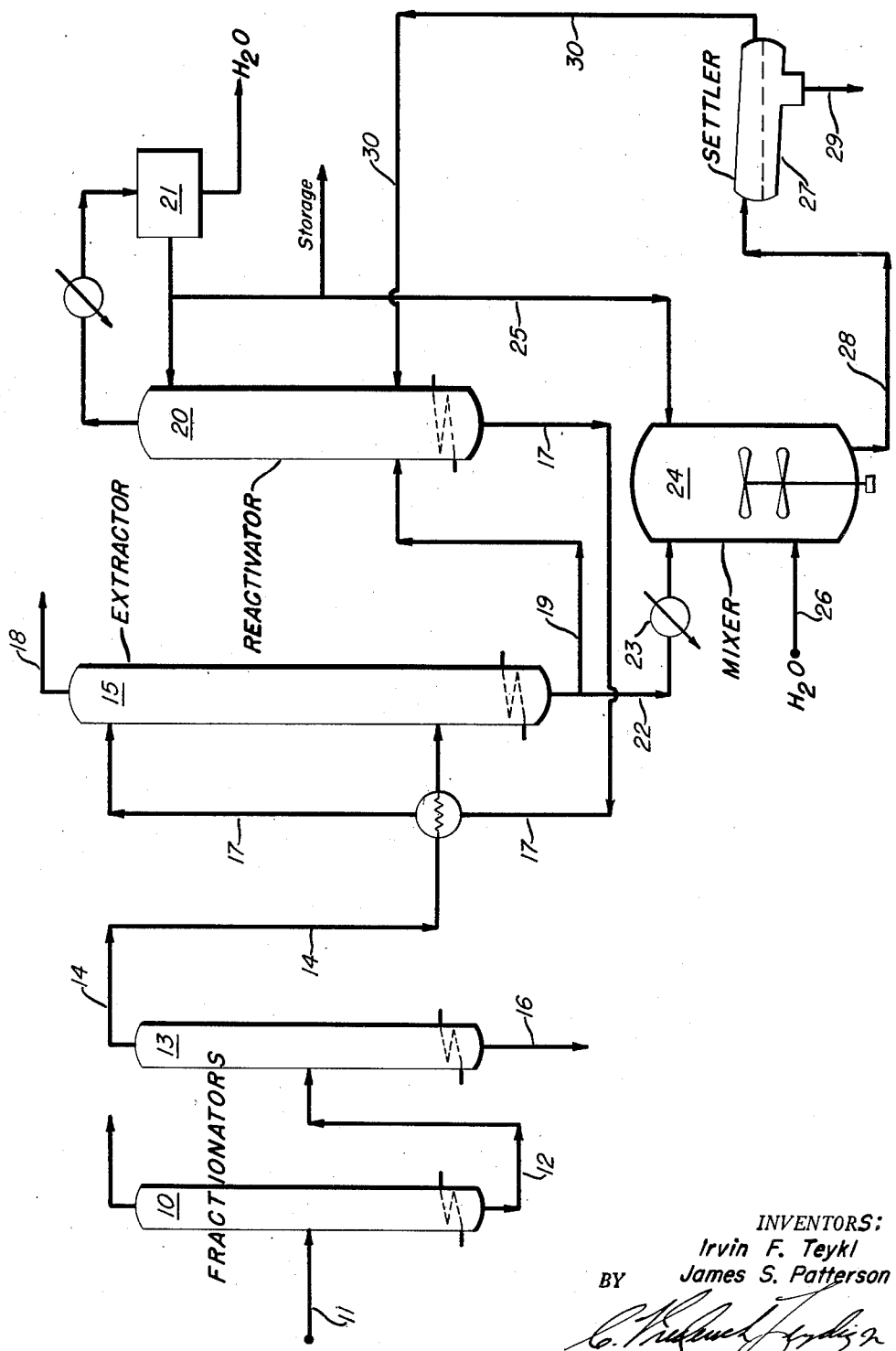

2,698,831

AROMATIC RECOVERY PROCESS

Irvin F. Teykl, Houston, and James S. Patterson, Texas City, Tex., assignors, by mesne assignments, to Pan American Refining Corporation, Texas City, Tex., a corporation of Texas Application October 7, 1952, Serial No. 313,484

6 Claims. (Cl. 202—39.5)

This invention relates to the purification of a solvent employed in an extractive distillation process to recover a pure aromatic from a narrow boiling hydrocarbon fraction. More particularly it concerns the removal of a troublesome sludge which accumulates in a phenolic solvent employed in such a process.

To recover pure aromatic hydrocarbons from petroleum distillates and the like, it is first necessary to fractionally distill the same to concentrate the aromatic. Aromatic compounds in admixture with closely boiling hydrocarbons cannot ordinarily be recovered in high purity by distillation alone because of the existence of azeotropic mixtures of the aromatics and other hydrocarbons. It is, therefore, common practice to extractively distill very narrow boiling, aromatic-containing concentrates with a suitable solvent. It has been found that a troublesome sludge is formed during such a process, which, if allowed to accumulate in the solvent to more than a certain maximum concentration it will settle out on the bubble cap trays of the extractive distillation tower. Operation of the tower becomes erratic when a quantity of this sludge has accumulated on the trays and incipient flooding often occurs. These sludges comprise iron derivatives and in the case of phenolic solvents, which are preferably employed, a substantial amount of aryl ethers.

It is an object of the present invention to provide a method of reducing the sludge content of the solvent employed in an aromatic recovery extractive distillation process. A further object is to eliminate incipient flooding and other operational failures in the extractive distillation tower employed in such a process. Still another object is to maintain the solvent at its highest efficiency. These and additional objects will become apparent from the following detailed description of the present invention.

Briefly, it has been discovered that the sludge content of the circulating solvent employed to separate a pure aromatic from a hydrocarbon distillate by vapor phase extraction or extractive distillation, can be maintained below a certain maximum concentration (hereinafter more fully defined) by withdrawing a relatively small portion of the rich solvent leaving the extractive distillation tower and contacting it with additional aromatic and water. The rich solvent, water and added aromatic are vigorously agitated and then settled. A two- or three-phase system then forms, of which the lower phase or phases comprise water and a substantial amount of the sludge introduced to the mixer. The upper phase comprising substantially all of the aromatic and solvent is then recycled to the solvent reactivator wherein the solvent is recovered from the aromatic, water, etc. and then recycled to the extraction zone.

In the drawing is shown a simplified schematic flow diagram of the equipment for carrying out this invention. Referring to the drawing, a gasoline distillate fraction, e. g. such as results from hydroforming a naphthenic heavy naphtha in accordance with the process set forth in U. S. 2,388,536, containing a relatively small amount of benzene is introduced to precision fractionation tower 10 via line 11. The distillate is therein fractionated to remove overhead those materials lighter than benzene. Benzene and other closely boiling materials are withdrawn from tower 10 via line 12 and introduced to a second precision fractionation tower 13 wherein substantially all of the benzene is removed overhead via line 14. The narrow boiling, benzene-containing fraction is then introduced to extractive distillation tower 15. The material heavier than benzene is withdrawn from tower 13 via line 16. By carefully adjusting the conditions in towers 10 and 13, the overhead fraction from tower 13 which is introduced to extractive distillation tower 15 will contain at least about 5 to 10% benzene.

The overhead fraction from tower 13, which may hereinafter be referred to as the benzene concentrate, is introduced to tower 15 via line 14 at a temperature above the boiling point of benzene and contacted therein with phenol introduced to the tower via line 17. The solvent flows downward counter-current to the up-flowing vapors thereby selectively removing the benzene from the closely boiling hydrocarbons. These closely boiling hydrocarbons from which the benzene has been scrubbed pass out the top of tower 15 via line 18. The rich solvent containing the benzene is withdrawn from the tower via line 19 and is introduced to reactivator tower 20 (a distillation column) wherein the benzene is stripped from the solvent which is recycled to tower 15 via line 17. The pure benzene passes out the top of tower 20 and is separated from water in condenser 21 and then passed to storage, not shown.

A portion of the rich solvent leaving tower 15 may be withdrawn from line 19 and introduced via line 22, through cooler 23 to mixer 24 wherein it is admixed with pure benzene via line 25 and water from line 26 in amounts hereinafter more fully defined. After agitation in mixer 24 the mixture is passed to settler 27 via line 28 where phase separation occurs and a lower aqueous layer is withdrawn via line 29. The upper benzene-solvent layer is decanted via line 30 and recycled to tower 20. The lower aqueous phase contains a substantial portion of the sludge.

The present invention particularly concerns the reduction of the solvent sludge content and it should be understood that the fractionation and extractive distillation techniques described constitute known practice and that no claim of novelty is made thereto. A more detailed description of a process of this general type whereby pure aromatics may be recovered is set forth in U. S. Reissue Patent 22,379. The present invention constitutes an improvement in that and other such processes wherein the problem of sludge formation has been found to occur.

As noted above, the sludge comprises essentially aryl ethers and certain iron compounds when operating with phenolic solvents. With such solvents it has been found that the quantity of aryl ether in the circulating solvent should be maintained below about 8% and preferably below about 7% by weight of the lean solvent to prevent sludge from settling out on the bubble cap plates. Likewise, the iron content, based upon $Fe_2O_3$, should be below about 0.05% and preferably below about 0.03% by weight of total solvent to assure substantial freedom from sedimentation. The sludge, which is soluble to some extent in phenol, is preferentially water soluble when allowed to settle in such an aqueous mixture of phenol and aromatic. It is evident that the constituents of the sludge vary in solubility over a relatively wide range and that some are more oil soluble than others inasmuch as the removal of sludge in any given settling operation, in accordance herewith, is not complete. About half of the sludge which enters the settler along with the water, phenol and aromatic is ordinarily removed in each settling step. The aryl ether and iron contents, if initially above the critical concentrations, are thus reduced to a satisfactory level in a relatively short time and thereafter maintained in such condition. Whereas both major sludge components, viz. aryl ethers and iron, should be maintained below the above figures and while reduction of one will accompany reduction of the other, it is critically important that the aryl ether content be maintained therebelow. If the ether content is maintained below such figure the iron content may rise somewhat above the stated maximum without incurring sedimentation, etc.

An example of the operation of the solvent purification technique is as follows: About 304 pounds of rich solvent were removed from the base of the extractive distillation tower in one hour and introduced to the mixer. This stream analyzed 254 pounds of phenol, 33.5 pounds of benzene, 16 pounds of sludge and contained 0.095 pounds of iron based on $Fe_2O_3$. A total of about 95.5 pounds of water and about 361 pounds of substantially pure benzene were mixed therewith and the mixture was settled. A three phase system formed, of which the top layer comprised about 295 pounds of benzene, 251 pounds of phenol, 9.4 pounds of sludge, 26.8 pounds of water and had an iron content of 0.065 pounds. The middle layer comprised substantially all water (about 68 pounds) and the lower layer comprised about 7 pounds of sludge, 3 pounds of phenol and contained about 0.036 pounds of iron. The top layer was recycled to the solvent reactivator tower wherein the solvent and benzene were separated and about 27 pounds of water were condensed from the benzene overhead. The lower layers in the settler were discarded. The reduction in sludge and iron (on the basis of $Fe_2O_3$) resulting from this single equilibrium treatment was, therefore, 43% and 38% respectively.

The purification of the phenol solvent in accordance herewith should be conducted at relatively low temperatures and preferably at a temperature below about 110° F. It is, therefore, preferable to reduce the temperature of the benzene and the rich phenol leaving the extraction zone to at least this temperature prior to introducing same to the mixer. The temperature at which sludge may be removed from solvents other than phenol will vary in accordance with the solubility characteristics of the solvent relative to water and the aromatic hydrocarbon. Thus, in the case of phenol, use of a temperature higher than about 110° F. results in substantial loss of solvent because of its increased solubility in water at higher temperatures. Similarly, the temperature-solubility relationship of water and solvents other than phenol, which may be used in place thereof, should be carefully observed in order to prevent such a loss of solvent.

The amount of the circulating solvent subjected to purification may vary with the amount of sludge present and the rate of its build-up. The amount and rate of build-up of sludge are in turn dependent upon a variety of factors, e. g. diolefin and oxygen content of the aromatic concentrate, temperature of the circulating solvent, and its velocity through the lines, etc. Generally, however, between about 10% and about 30% of the total volume of circulating solvent should be treated per day in accordance herewith to maintain the sludge within satisfactory limits. Greater amounts may be treated but it is usually economically unjustifiable.

It should be clearly understood, in connection with the volume of solvent treated, that in a system having, for example, about 100 barrels of circulating solvent that far less than 10 to 30% of that total is treated in any single purification. In other words, while there are only 100 barrels of solvent in the system, the volume of solvent which passes any point in that system in a single day is many times greater than 100 barrels because of re-circulation. The amount of solvent withdrawn from a given stream for treatment in a single desludging operation is accordingly very much less than 10 to 30% of the total solvent passing that point. Thus, only a small portion, e. g. 0.25% to 1% of the total rich solvent leaving the extraction zone in one day need ordinarily be treated according to the present invention. Since from 10% to about 30% of the total solvent in the system is thereby treated in a day's time, however, the proper balance is readily maintained.

The purification technique may be employed continually or only as needed to offset a rise in sludge content. Thus, it need not be operated every day if the sludge build-up is slight. The desludging process may operate intermittently on a batch basis or a substantially continuous process in which two or more settlers are alternately settled and filled may be employed.

The ratio of aromatic to solvent in the solvent purification step should be at least about 1:1, on a weight basis, and preferably about 1.5:1. Greater quantities of aromatic offer no particular improvement but may be employed. It is preferred, as described, to treat the rich aromatic containing solvent to remove the sludge because the aromatic already present therein aids the complete admixture of the added aromatic and also because the temperature of the stream leaving the extraction zone is ordinarily lower and requires less cooling than the stripped solvent leaving the reactivator. It should be understood, however, that the lean solvent from the reactivator may be treated in a similar manner in accordance herewith.

The amount of water added to the rich solvent, and aromatic, should be at least about 10% by weight of the total mixture and preferably from about 15% to about 25%. More may be used but without added advantage.

Whereas the invention has been described with particular reference to the recovery of benzene and purification of a solvent comprising phenol it should be understood that it is not so limited and that various other solvents may be used; and depending upon the boiling range of the concentrate introduced to the extraction distillation tower various aromatics may be recovered and employed in accordance herewith. Thus, as examples of solvents suitable for the recovery of aromatics from such narrow boiling concentrates, are cresylic acids, alkyl phenols, aniline, diphenylamine, Carbitol's, etc. The solvents must be chemically and thermally stable under the conditions encountered.

Aromatics such as toluene, xylenes and ethylbenzene, paracymene, naphthalene, methyl naphthalenes and the like may be recovered in pure form by proper selection of the solvent and employed in the solvent purification steps herein described similarly to benzene.

Having thus described the invention, what we claim as novel and desire to protect by Letters Patent is as follows:

1. In the process which embodies recovering a substantially pure aromatic from a vaporized narrow boiling hydrocarbon mixture by extraction with a liquid phenolic solvent, the improvement which comprises reducing the sludge content of said solvent by admixing at least a portion of the circulating solvent with at least about an equal weight of the substantially pure aromatic recovered in said process and a substantial amount of water at a temperature below that at which the solvent is substantially soluble in water, settling the aqueous mixture thus produced at such a temperature to obtain stratification thereof, recycling the upper solvent and aromatic-containing stratum to a solvent recovery zone and discarding the material below said upper stratum.

2. In the process which embodies recovering a substantially pure aromatic from a vaporized narrow boiling hydrocarbon mixture by extraction with a liquid phenolic solvent the improvement which comprises reducing the sludge content of said solvent by admixing at least a portion of the rich aromatic-containing solvent from the extraction zone with at least about an equal weight of the substantially pure aromatic recovered in said process and a substantial amount of water at a temperature below that at which the solvent is substantially soluble in water, settling the aqueous mixture thus produced at such a temperature to obtain stratification thereof, recycling the upper solvent and aromatic-containing stratum to a solvent recovery zone and discarding the material below said upper stratum.

3. In the process which embodies recovering a substantially pure aromatic from a vaporized narrow boiling hydrocarbon mixture by extraction with a liquid phenolic solvent, the improvement which comprises admixing at least a portion of the rich aromatic-containing solvent with at least about an equal weight of the substantially pure aromatic recovered in said process and a substantial amount of water at a temperature below about 110° F., settling the aqueous mixture thus produced at such temperature to obtain stratification, recycling the upper phenol and aromatic-containing stratum to a solvent recovery zone and discarding the material below said upper stratum.

4. The process of claim 2 wherein the narrow boiling hydrocarbon mixture comprises a benzene concentrate recovered from the gasoline fraction resulting from hydro-forming naphthenic heavy naphtha and the substantially pure aromatic is benzene.

5. In the process which embodies recovering substantially pure benzene from a narrow boiling hydrocarbon fraction by extractive distillation with a liquid phenolic solvent, the improvement which comprises admixing at least a portion of the circulating phenolic solvent with at least about an equal weight of substantially pure benzene and an amount of water equal to at least about 10% by weight of the total admixture at a temperature below about 110° F., settling the aqueous mixture thus produced at such a temperature to obtain stratification thereof, recycling the upper solvent and benzene-containing stratum to a solvent recovery zone and discarding the material below said upper stratum.

6. The improved process of claim 5 wherein the solvent comprises essentially phenol.

References Cited in the file of this patent

UNITED STATES PATENTS

| | | |
|---|---|---|
| 2,375,035 | Pierotti | May 1, 1945 |
| 2,426,705 | Patterson et al. | Sept. 2, 1947 |
| 2,523,554 | Boatright et al. | Sept. 26, 1950 |